US011956392B2

(12) United States Patent
Takahashi et al.

(10) Patent No.: US 11,956,392 B2
(45) Date of Patent: Apr. 9, 2024

(54) IMAGE FORMING APPARATUS AND CONTROL METHOD FOR CONTROLLING IMAGE FORMING APPARATUS

(71) Applicants: Yoshihiro Takahashi, Tokyo (JP); Noboru Hirano, Kanagawa (JP)

(72) Inventors: Yoshihiro Takahashi, Tokyo (JP); Noboru Hirano, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 346 days.

(21) Appl. No.: 17/487,885

(22) Filed: Sep. 28, 2021

(65) Prior Publication Data

US 2022/0109767 A1 Apr. 7, 2022

(30) Foreign Application Priority Data

Oct. 2, 2020 (JP) .................................. 2020-167801

(51) Int. Cl.
*H04N 1/04* (2006.01)
*H04N 1/00* (2006.01)
*B41J 2/01* (2006.01)

(52) U.S. Cl.
CPC ....... *H04N 1/00702* (2013.01); *H04N 1/0057* (2013.01); *H04N 1/00734* (2013.01); *H04N 1/00748* (2013.01); *H04N 1/00761* (2013.01); *H04N 1/00795* (2013.01); *B41J 2/01* (2013.01)

(58) Field of Classification Search
USPC ........................................ 358/1.5, 1.12, 498
See application file for complete search history.

(56) References Cited

U.S. PATENT DOCUMENTS

| 2009/0026689 | A1* | 1/2009 | Noguchi | B65H 5/062 271/8.1 |
| 2013/0050314 | A1* | 2/2013 | Duke | B41J 3/60 347/9 |
| 2014/0314281 | A1* | 10/2014 | Kojima | H04N 1/00045 382/112 |
| 2016/0219172 | A1* | 7/2016 | Mita | H04N 1/00713 |
| 2017/0131671 | A1* | 5/2017 | Nishimura | G03G 15/5062 |
| 2022/0091797 | A1* | 3/2022 | Sakamoto | G06F 3/1208 |

FOREIGN PATENT DOCUMENTS

JP 2008-271473 11/2008
JP 2014-065255 4/2014

* cited by examiner

*Primary Examiner* — Cheukfan Lee
(74) *Attorney, Agent, or Firm* — Duft & Bornsen, PC

(57) ABSTRACT

An image forming apparatus includes a conveyer configured to convey a recording medium on which a mark is formed; an image reader configured to read an image formed on the recording medium while the recording medium is being conveyed; a detector configured to detected a value corresponding to a conveyance amount of the recording medium conveyed by the conveyer and output the detected value; and a processor and a memory that stores program instructions causing the processor to calculate a position of the mark on the recording medium with respect to a conveyance direction of the recording medium based on respective detected values output from the detector when an edge of the recording medium and the mark are read by the image reader.

9 Claims, 12 Drawing Sheets

IMAGE FORMING APPARATUS AND CONTROL METHOD FOR CONTROLLING IMAGE FORMING APPARATUS

CROSS-REFERENCE TO RELATED APPLICATIONS

The present application is based on and claims priority under 35 U.S.C. § 119 to Japanese Patent Application No. 2020-167801, filed Oct. 2, 2020. The contents of Japanese Patent Application No. 2020-167801 are incorporated herein by reference in their entirety.

BACKGROUND OF THE INVENTION

1. Field of the Invention

The present invention relates to an image forming apparatus and a control method for controlling an image forming apparatus.

2. Description of the Related Art

With regard to an image forming apparatus, a technique is known; in the technique, an image of each color is sequentially test-printed on a sheet of paper that is conveyed by a roller, and a printing position is corrected according to an amount of an image shift with respect to each color, thereby preventing out of color registration with respect to an image printed on the sheet of paper otherwise caused by an eccentricity of the roller (for example, see Japanese unexamined patent application publication No. 2014-65255). Further, with regard to an image forming apparatus such as a multifunction peripheral including a scanner and a printer, a technique of detecting marks printed for correction on a conveyed sheet of paper by an image reading device and correcting a print image in accordance with positions of the detected marks is known (see, for example, Japanese unexamined patent application publication No. 2008-271473).

SUMMARY OF THE INVENTION

An image forming apparatus according to one aspect of the present invention includes a conveyer configured to convey a recording medium on which a mark is formed; an image reader configured to read an image formed on the recording medium while the recording medium is being conveyed; a detector configured to detected a value corresponding to a conveyance amount of the recording medium conveyed by the conveyer and output the detected value; and a processor and a memory that stores program instructions causing the processor to calculate a position of the mark on the recording medium with respect to a conveyance direction of the recording medium based on respective detected values output from the detector when an edge of the recording medium and the mark are read by the image reader.

Other objects, features, and advantages of the present invention will become more apparent from the following detailed description when read in conjunction with the accompanying drawings.

DESCRIPTION OF THE EMBODIMENTS

Figure 1:
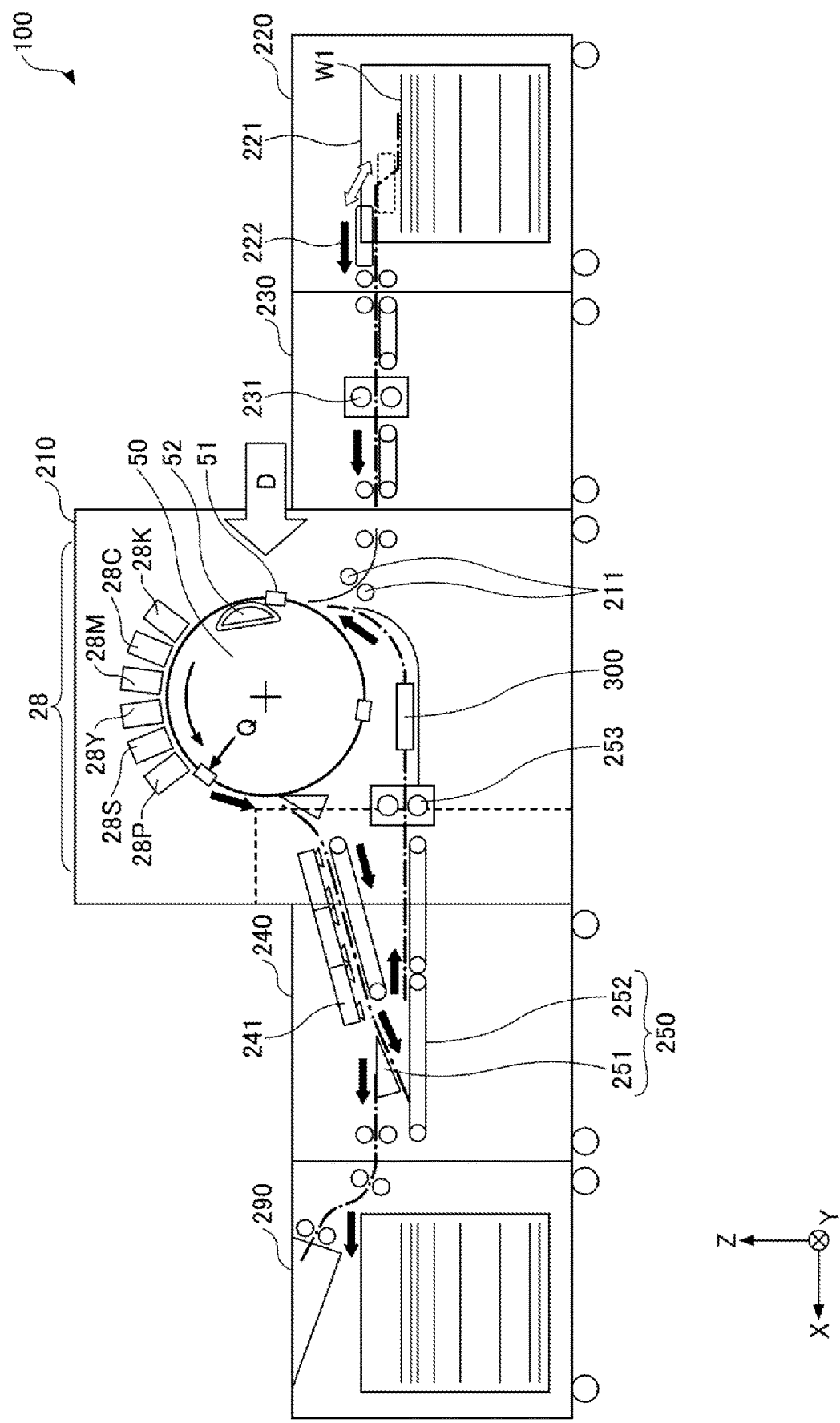
FIG. 1 is a block diagram depicting an example of an image forming apparatus according to a first embodiment.

In the above-described type of an image forming apparatus, a position of a mark printed on a sheet of paper is calculated by, for example, multiplying the number of lines scanned before detecting the mark by a line scan cycle, and then, multiplying the product of the first multiplication by the conveyance speed of the sheet of paper. However, if the conveyance speed varies when an image of a sheet of paper on which a mark is printed is read, it is difficult to accurately calculate the position of the mark. If the position of the mark cannot be calculated correctly, correction of a printed image in accordance with the position of the mark may not be performed correctly.

Embodiments of the present invention have been contrived in view of the above-described situation and have an object of accurately detecting a mark printed on a sheet of paper.

According to the embodiments, a position of a mark printed on a sheet of paper can be accurately detected.

Hereinafter, the embodiments will be described with reference to the drawings. In each drawing, the same components are indicated by the same reference numerals and overlapping descriptions may be omitted. In the following, a symbol representing a signal is also used as a symbol representing a signal line.

First Embodiment

FIG. 1 is a block diagram depicting an example of an image forming apparatus according to a first embodiment.

For example, the image forming apparatus 100 depicted in FIG. 1 is an on-demand-type line-scanning-type ink-jet recording apparatus. The image forming apparatus 100 includes an image forming unit 210, a paper feeding unit 220, a registration adjusting unit 230, a dryer unit 240, a sheet inverting unit 250, and a paper ejecting unit 290.

The paper feeding unit 220 feeds a sheet of paper from a paper feeding stack 221 to an air separating unit 222, the sheet of paper being separated one by one by the air separating unit 222, the separated sheet of paper then being sequentially conveyed to the registration adjusting unit 230. The registration adjusting unit 230 corrects an inclination of the sheet of paper by a pair of registration rollers 231 and conveys the inclination-corrected sheet of paper toward the image forming unit 210. The sheet of paper is an example of a recording medium.

The image forming unit 210 grips a front edge portion of the conveyed sheet paper by a paper gripper 51 disposed on a surface of a cylindrical drum 50. The image forming unit 210 conveys the sheet of paper to a position facing head modules 28 (28K, 28C, 28M, 28Y, 28S, and 28P) by rotating the drum 50. The head modules 28K, 28C, 28M, 28Y, 28S, and 28P are circumferentially disposed at predetermined intervals on the surface of the drum 50. Each head module 28 is a recording head unit of an ink jet type capable of discharging ink; and is filled with a predetermined ink color.

The image forming unit 210 forms an image on the sheet of paper by causing the plurality of head modules 28K-28P to discharge ink (liquid) to an outer circumferential surface of the sheet of paper held on a surface of the drum 50. An nozzle maintenance discharge receiver 52 is provided on the outer circumferential surface of the drum 50 to receive ink discharged for nozzle maintenance when the head modules 28 have not discharged ink to a sheet of paper. The sheet of paper on which an image is thus formed by the image forming unit 210 is fed to the dryer unit 240.

The dryer unit 240 has a drying unit 241 to evaporate moisture contained in the sheet of paper as the sheet of paper passes beneath the drying unit 241. The dryer unit 240 includes a sheet inverting unit 250 including a paper inverting mechanism 251 and an inverting conveying unit 252. The sheet inverting unit 250 inverts the sheet of paper for which printing has been made on one side in a double-sided printing mode and conveys the inverted sheet of paper toward the image forming unit 210 by the inverting conveying unit 252.

In a single-sided printing mode, the sheet of paper for which printing has been made on one side and drying has been completed by the dryer unit 240 is conveyed to the paper ejecting unit 290. When printing has been made on both sides of the sheet of paper in the double-sided printing mode, the sheet of paper that has been dried by the dryer unit 240 is conveyed to the paper ejecting unit 290. Sheets of paper conveyed to the paper ejecting unit 290 are loaded into the paper ejecting unit 290 in an aligned manner.

The sheet of paper conveyed to the image forming unit 210 by the inverting conveying unit 252 undergoes correction of an inclination of the sheet of paper by the registration rollers 253 disposed inside the image forming unit 210 and is fed to the drum 50 through a mark position calculating apparatus 300.

The mark position calculating apparatus 300 detects positions of marks for correction printed on a front side (a first side) of the sheet of paper. Shapes and the like of the marks for correction will be described with reference to FIGS. 2A and 2B. For example, the mark position calculating apparatus 300 detects positions of marks on a sheet of paper with respect to the conveyance direction of the sheet of paper. The image forming unit 210 corrects a position, a tilt, a shape, or the like of an image when printing the image on a back side (a second side) of the sheet of paper based on the positions of the thus detected marks on the front side of the sheet of paper.

This prevents misalignment or the like from occurring between images printed on both sides of the sheet of paper. The positions of the marks detected by the mark position calculating apparatus 300 on the sheet of paper can be used also to confirm whether an image is printed at a predetermined position on one side of the sheet of paper. When printing on a sheet of paper has not been performed at a predetermined position, the image forming unit 210 corrects a printing position of an image during a next printing job.

The image forming apparatus 100 includes the mark position calculating apparatus 300 and may be a multifunction printer (MFP) having a copy function, a facsimile function, a printing function, and a scanner function. Alternatively, the image forming apparatus 100 includes the mark position calculating apparatus 300 and may be one of a variety of printers having double-sided printing functions.

Figure 2A:
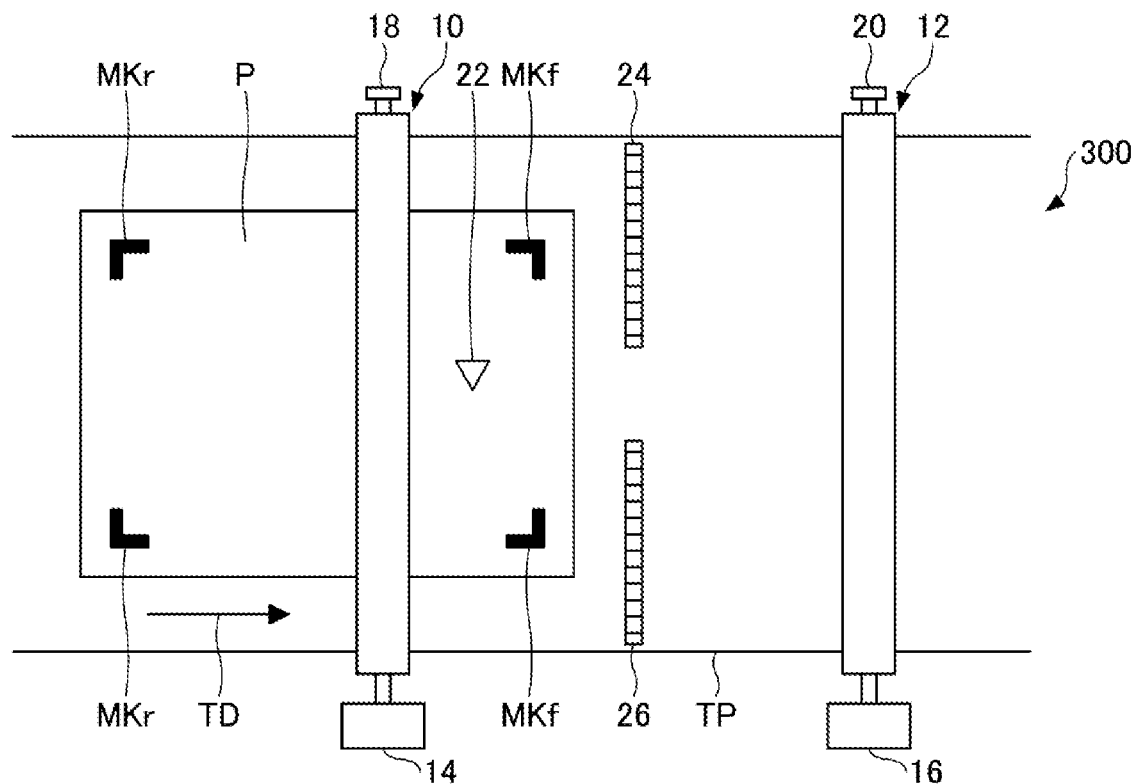
FIGS. 2A and 2B are explanatory diagrams depicting an outline of a mark position calculating apparatus depicted in FIG. 1.
Figure 2B:
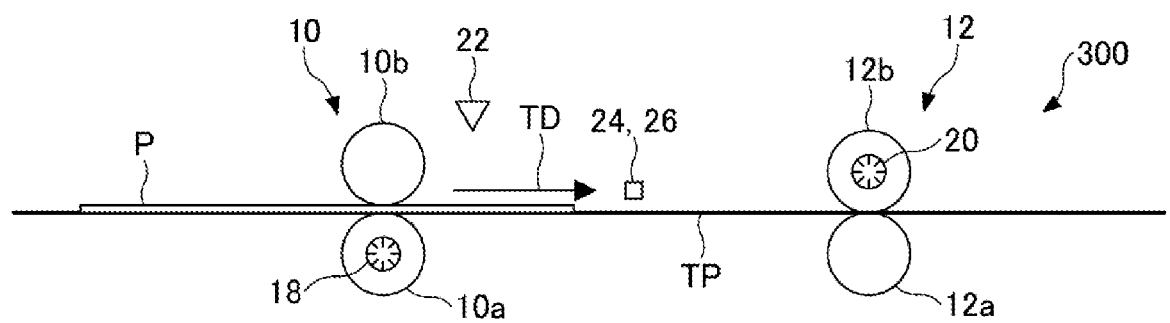

FIGS. 2A and 2B are explanatory diagrams depicting an outline of the mark position calculating apparatus 300 of FIG. 1. FIG. 2A depicts a plan view of major parts of the mark position calculating apparatus 300, and FIG. 2B depicts a side view of major parts of the mark position calculating apparatus 300. The mark position calculating apparatus 300 includes conveying rollers 10 and 12, conveying motors 14 and 16, encoders 18 and 20, conveyance sensors 22, and contact image sensors (CIS) 24 and 26. The conveying motors 14 and 16 are an example of a conveyer. The encoders 18 and 20 are an example of a detector. The CIS 24 and 26 are an example of an image reader.

At four corners of a front side of a sheet of paper P (a top side in FIGS. 2A and 2B) conveyed on a conveying member TP that is one specific example of a conveying path for conveying the sheet of paper P, marks MK for correction of an image for when printing an image on a back side of the sheet of paper P are printed. Hereinafter, marks MK located in a front edge area with respect to a conveyance direction TD of the sheet of paper P in a sheet of paper P (near a right edge in FIG. 2A and 2B) are referred to as marks MKf, and marks MK located in a rear edge area with respect to the conveyance direction TD in the sheet of paper P (near a left edge of FIGS. 2A and 2B) are referred to as marks MKr. Hereinafter, the conveyance direction TD of a sheet of paper P is also referred to as a sub-scanning direction, and a direction perpendicular to the conveyance direction TD of a sheet of paper P is also referred to as a main-scanning direction.

The conveying rollers 10 include a driving roller 10a disposed below the conveying member TP and a driven roller 10b disposed above the conveying member TP toward an upstream side (a left side in FIGS. 2A and 2B) in the conveying member TP on which a sheet of paper P is conveyed. A sheet of paper P placed on the conveying member TP is moved in the conveyance direction TD while being sandwiched together with the conveying member TP between the driving roller 10a and the driven roller 10b.

The conveying rollers 12 includes a driving roller 12a disposed below the conveying member TP and a driven roller 12b disposed above the conveying member TP toward a downstream side (a right side in FIGS. 2A and 2B) in the conveying member TP on which a sheet of paper P is conveyed. A sheet of paper P placed on the conveying member TP is moved in the conveyance direction TD while being sandwiched together with the conveying member TP between the driving roller 12a and the driven roller 12b.

As described above, the conveying member TP is one specific example of a conveying path for conveying the sheet of paper P, and, may be, for example, a conveying belt in a form of an endless belt driven by the conveying rollers 10 and the conveying rollers 12 to convey the sheet of paper P as described above. In this case, although not depicted, the conveying member TP is also supported by other driven rollers appropriately so that the conveying member TP can run along an endless course to convey the sheet of paper P as depicted in FIGS. 2A and 2B.

The conveying motor 14 is mounted to one end of the driving roller 10a and rotates the conveying rollers 10 by rotating the driving roller 10a. The conveying motor 16 is mounted to one end of the driving roller 12a and rotates the conveying rollers 12 by rotating the driving roller 12a.

The encoder 18 is mounted to the other end of the driving roller 10a and outputs a rotation amount of the driving roller 10a as a count value. The encoder 20 is mounted to the other end of the driven roller 12b and outputs a rotation amount of the driven roller 12b as a count value. Count values output by the encoders 18 and 20 are an example of a detected value output from a detector in accordance with a conveyance amount of a sheet of paper P.

For example, a conveyance linear velocity, which is a speed of a sheet of paper P fed by the conveying rollers 10, is managed by the encoder 18 mounted to the driving roller 10a. A length of a sheet of paper P is measured by an encoder 20 mounted to the driven roller 12b.

The conveyance sensor 22 detects edges (a front edge and a rear edge with respect to the conveyance direction) of a sheet of paper P that is conveyed on the conveying member TP. Each of the CIS 24 and 26 has a plurality of image sensors arranged along the main-scanning direction. For example, each image sensor sensor has three light receiving elements that each detect three colors of RGB.

The CIS 24 is disposed toward an encoder (18 and 20) side over the conveying member TP and is used to read marks MK toward the encoder (18 and 20) side included in marks MK printed on a sheet of paper P which is conveyed on the conveying member TP. The CIS 26 is disposed toward a conveying-motor (14 and 16) side over the conveying member TP and is used to read marks MK toward the conveying-motor (14 and 16) side included in the marks MK printed on the sheet of paper P which is conveyed on the conveying member TP. Image data of an image (other than marks MK) printed on a sheet of paper P conveyed on the conveying member TP may be obtained by using a CCD instead of the CIS 24 and 26.

Figure 3:
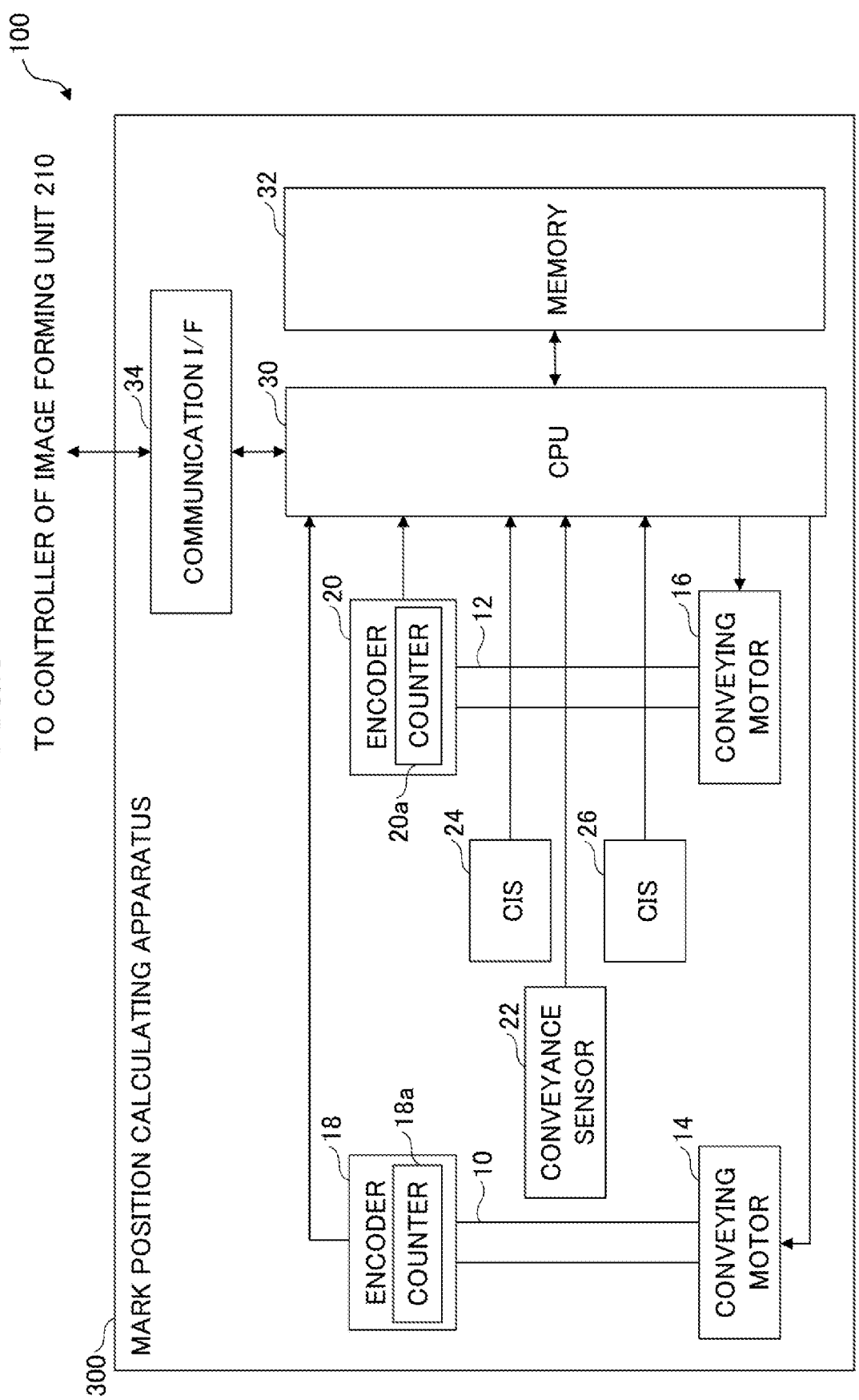
FIG. 3 is a functional block diagram depicting an example of the mark position calculating apparatus depicted in FIG. 1.

FIG. 3 is a functional block diagram depicting an example of the mark position calculating apparatus 300 of FIG. 1. The mark position calculating apparatus 300 includes a central processing unit (CPU) 30, a memory 32 accessed by the CPU 30, and a communication interface (I/F) 34, in addition to various elements depicted in FIGS. 2A and 2B. The CPU 30 is an example of a processor for calculating a position of a mark MK with respect to the conveyance direction of a sheet of paper P (not depicted).

For example, the CPU 30 implements the functions of the mark position calculating apparatus 300 by executing control programs stored in the memory 32. The memory 32 is a volatile memory, such as an SRAM, or an electrically rewritable non-volatile memory, such as a flash memory.

The communication interface 34 transmits and receives information to and from a controller (not depicted) controlling the image forming unit 210 of FIG. 1. For example, the CPU 30 outputs position information representing positions of marks MK on a front side of a sheet of paper P detected by the mark position calculating apparatus 300 to the controller of the image forming unit 210. Therefore, the image forming unit 210 can correct an image to be printed on a back side of the sheet of paper P based on the positions of the marks MK calculated by the mark position calculating apparatus 300.

The CPU 30 controls the conveying motors 14 and 16 to rotate the conveying rollers 10 and 12. The CPU 30 adjusts rotation speeds of the conveying rollers 10 and 12 so that respective conveyance speeds of the conveying rollers 10 and 12 to convey a sheet of paper P conveyed on the conveying member TP depicted in FIGS. 2A and 2B can be made to be the same as each other.

The CPU 30 receives a count value representing a rotation amount of the conveying rollers 10 from the encoder 18 and receives a count value representing a rotation amount of the conveying rollers 12 from the encoder 20. As depicted in FIGS. 2A and 2B, the encoder 18 is connected to the driving roller 10a of the conveying rollers 10, and the encoder 20 is connected to the driven roller 12b of the conveying rollers 12.

The encoder 18 has a counter 18a that is updated in accordance with a rotation amount of the conveying rollers 10, and outputs a count value of the counter 18a to the CPU 30. The encoder 20 has a counter 20a that is updated in accordance with a rotation amount of the conveying rollers 12, and outputs a count value of the counter 20a to the CPU 30.

The encoder 18 may include a plurality of counters 18a for counting rotation amounts of each of the conveying rollers 10. The encoder 20 may include a plurality of counters 20a for counting rotation amounts of each of the conveying rollers 12. The counter 18a may be provided outside the encoder 18, and the counter 20a may be provided outside the encoder 20.

The CIS 24 reads images of areas facing the CIS 24 and the CIS 26 reads images of areas facing the CIS 26 on the conveying member TP and output read images as image data to the CPU 30. The CIS 24 and CIS 26 then output the read images (e.g., black backgrounds) of the conveying member TP when there is no sheet of paper at the facing areas. The CIS 24 and 26 read images printed on a sheet of paper or a white background of a sheet of paper when the sheet of paper is at the facing areas. The images printed on the sheet of paper include images of marks MK (black).

For example, the conveyance sensor 22 detects an edge of a sheet of paper P that is conveyed on the conveying member TP and provides a detection result to the CPU 30. The CPU 30 itself may detect the edge of the sheet of paper P based on sensor information received from the conveyance sensor 22. The CPU 30 stores the image data received from the CIS 24, 26 and the count values of the encoders 18, 20 in the memory 32.

Figure 4:
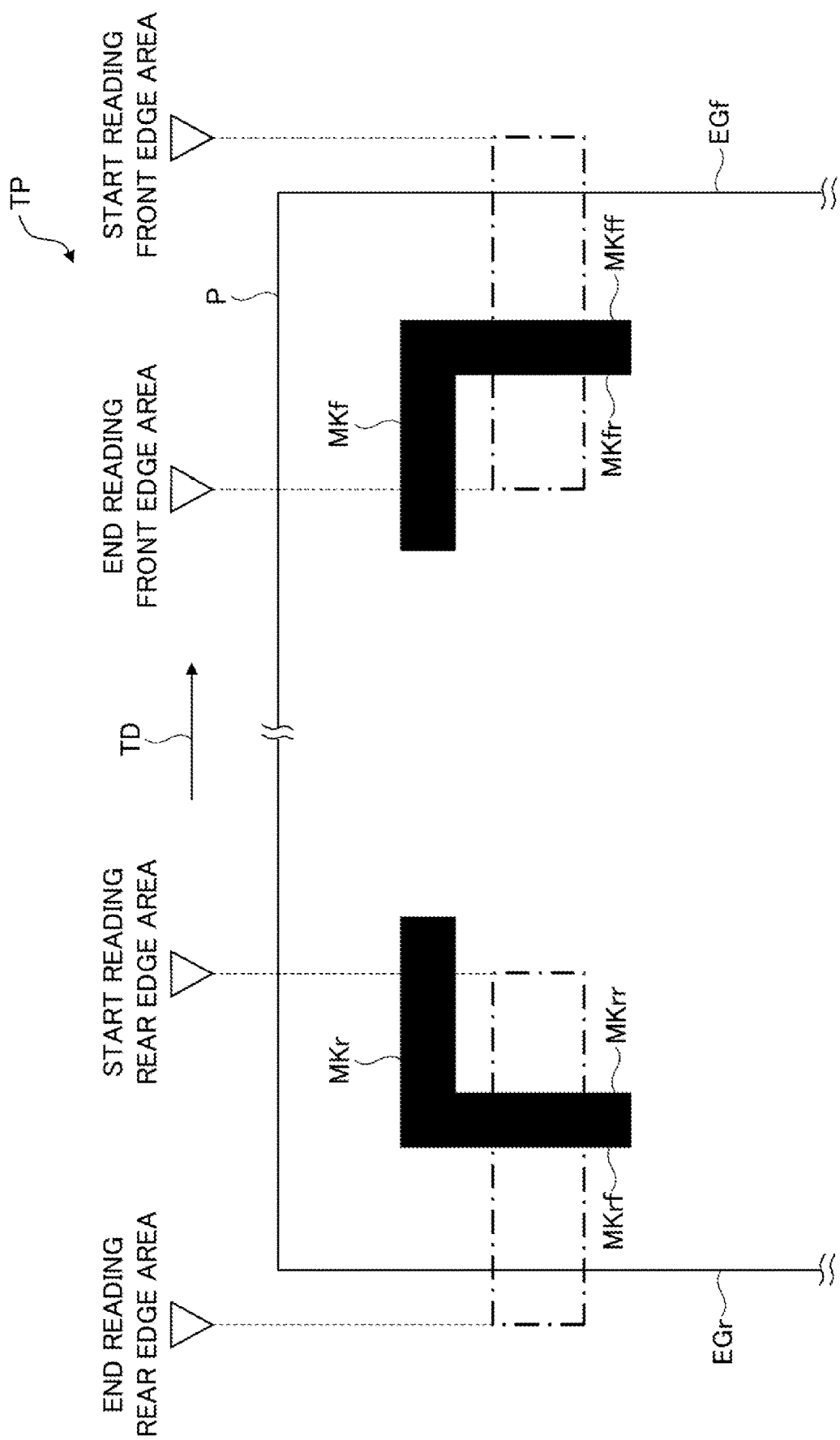
FIG. 4 is an explanatory diagram depicting an outline of a reading operation with respect to marks printed on a sheet of paper by the mark position calculating apparatus depicted in FIG. 3.

FIG. 4 is an explanatory diagram depicting an outline of a reading operation performed by the mark position calculating apparatus 300 of FIG. 3 with respect to marks MK printed on a sheet of paper P. Operations described in FIG. 4 may be implemented by the control programs executed by the CPU 30. FIG. 4 depicts an example in which marks MKf and MKr located toward the encoder (18 and 20) side are read by the CIS 24 depicted in FIGS. 2A and 2B. A reading operation with respect to a sheet of paper P by the CIS 26 is the same as the reading operation of FIG. 14. FIG. 4 depicts a state in which a sheet of paper P is being conveyed on the conveying member TP.

First, the CPU 30 starts reading a front edge area on a sheet of paper P (starts reading a front edge area) in response to reception of image data from the CIS 24 being started based on a fact that the front edge EGf of the sheet of paper P that is conveyed on the conveying member TP is detected by the conveyance sensor 22. The CPU 30 sequentially detects the front edge EGf of the sheet of paper P, a front edge MKff of a mark MKf, and a rear edge MKfr of the mark MKf based on a change in brightness of image data on a per line basis received from the CIS 24.

The CPU 30 detects the front edge EGf of the sheet of paper P when the brightness becomes higher than a predetermined threshold. Thereafter, the CPU 30 detects the front edge MKff of the mark MKf when the brightness becomes lower than a predetermined threshold. Furthermore, the CPU 30 detects the rear edge MKfr of the mark MKf when the brightness becomes higher than a predetermined threshold. Then, the CPU 30 ends reading the front edge area on the sheet of paper P (ends reading the front edge area) after an elapse of a predetermined time from the detection of the rear edge MKfr of the mark MKf.

Next, the CPU 30 starts reading a rear edge area on the sheet of paper P (starts reading a rear edge area) in response to reception of image data from the CIS 24 being started based on a fact that a count value of the encoder 20 becomes a predetermined value. The CPU 30 sequentially detects a rear edge MKrr of a mark MKr, a front edge MKrf of the mark MKr, and a rear edge EGr of the sheet of paper P based on a change in brightness of image data on a per line basis received from the CIS 24.

The CPU 30 detects the rear edge MKrr of the mark MKr when the brightness becomes lower than a predetermined threshold and detects the front edge MKrf of the mark MKr when the brightness becomes higher than a predetermined threshold. Furthermore, the CPU 30 detects the rear edge EGr of the sheet of paper P when the brightness becomes lower than a predetermined threshold. The CPU 30 ends reading the rear edge area on the sheet of paper P (ends reading the rear edge area) after an elapse of a predetermined time from the detection of the rear edge EGr of the sheet of paper P.

The CPU 30 may end the reading of the front edge area on the sheet of paper P after a count value of the encoder 20 is updated to a predetermined value from the detection of the rear edge MKfr of the mark MKf. Similarly, the CPU 30 may end the reading of the rear edge area on the sheet of paper P after a count value of the encoder 20 is updated to a predetermined value from the detection of the rear edge EGr of the sheet of paper P. The front edge EGf and the rear edge EGr of the sheet of paper P are examples of an edge.

Figure 5:
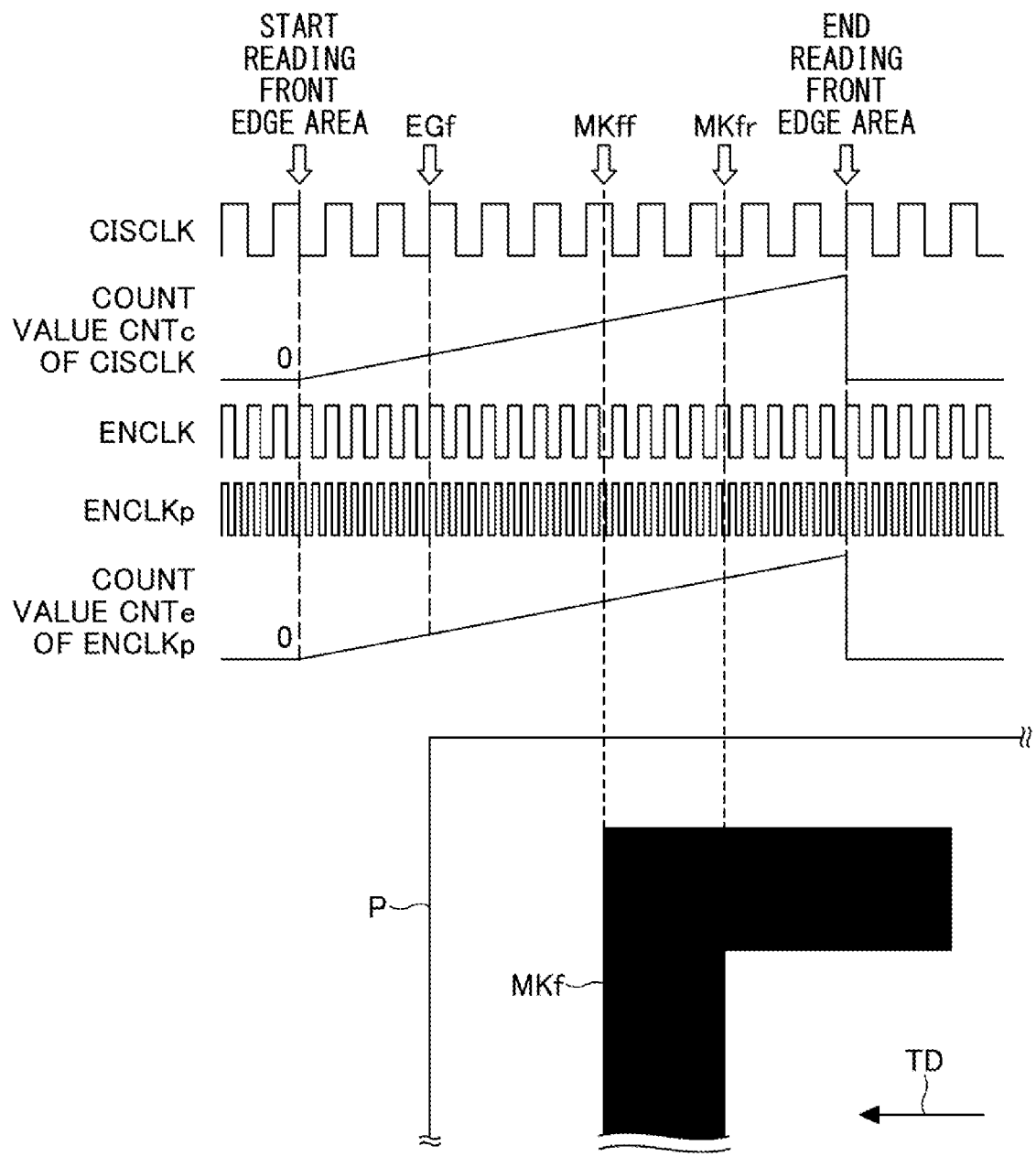
FIG. 5 is a timing diagram depicting an example of an operation of the mark position calculating apparatus for detecting a position of a mark in a front edge area depicted in FIG. 4.

FIG. 5 is a timing diagram depicting an example of operations of the mark position calculating apparatus 300 for detecting a position of a mark MKf in a front edge area of FIG. 4. For the same operation as in FIG. 4, the detailed description is omitted. In FIG. 5, an orientation (the conveyance direction TD) of a sheet of paper P described for reference is opposite to an orientation of a sheet of paper P in FIG. 4.

The CPU 30 resets a count value CNTc representing the number of clock pulses CISCLK with respect to the CIS 24 and 26 to "0" and starts counting clock pulses CISCLK upon determining that a timing to start reading a front edge area has come. Here, one cycle of a clock pulse CISCLK is a line cycle of CIS 24 and 26. In the example of FIG. 5, a time period from a falling edge of a clock pulse CISCLK to a next falling edge is one line cycle. In FIG. 5, a count value of CISCLK, i.e., CNTc is increasing linearly, however, in actuality, is increasing stepwise.

The CPU 30 resets a count value CNTe representing the number of clock pulses ENCLKp with respect to the encoder 20 to "0" and starts counting clock pulses upon determining that a timing to start reading a front edge area has come. Here, clock pulses ENCLKp are generated by multiplying several times a frequency of a basic clock pulses ENCLK of the encoder 20, and are used to detect a rotation amount of the conveying rollers 12. That is, an increase amount of a count value CNTe indicates a conveyance amount of a sheet of paper P.

Thereafter, the CPU 30 stores image data obtained from the CIS 24 and 26 on a per line basis in the memory 32 in association with a count value CNTe of the encoder 20. That is, the CPU 30 stores the numbers of lines when detecting a front edge EGf of a sheet of paper P, a front edge MKff of a mark MKf, and a rear edge MKfr of the mark MKf in association with count values CNTe.

Next, upon determining that a timing to end reading of a front edge area has come, the CPU 30 resets each of count values CNTc and CNTe to "0". Thereafter, as will be described later with reference to FIG. 8, the CPU 30 performs a process of calculating a position of the mark MKf on the sheet of paper P. A length of each mark MK with respect to the conveyance direction TD is determined to be more than twice a width of one line with respect to the sub-scanning direction. Thus, each of the CIS 24 and 26 requires at least three lines to scan to read each mark MK.

As described with reference to FIG. 4, the CPU 30 then starts counting the number of clock pulses CISCLK and the number of clock pulses ENCLKp of the encoder 20 upon determining that a timing to start reading a rear edge area has come. The CPU 30 stores image data obtained from the CIS 24 and 26 on a per line basis in the memory 32 in association with a count value CNTE of the encoder 20. That is, the CPU 30 stores the numbers of lines when detecting a front edge MKrf of a mark MKr, a rear edge MKrr of the mark MKr, and a rear edge EGr of a sheet of paper P in association with count values CNTe. Thereafter, as will be described with reference to FIG. 9, the CPU 30 performs a process of calculating a position of the mark MKr on the sheet of paper P.

Figure 6:
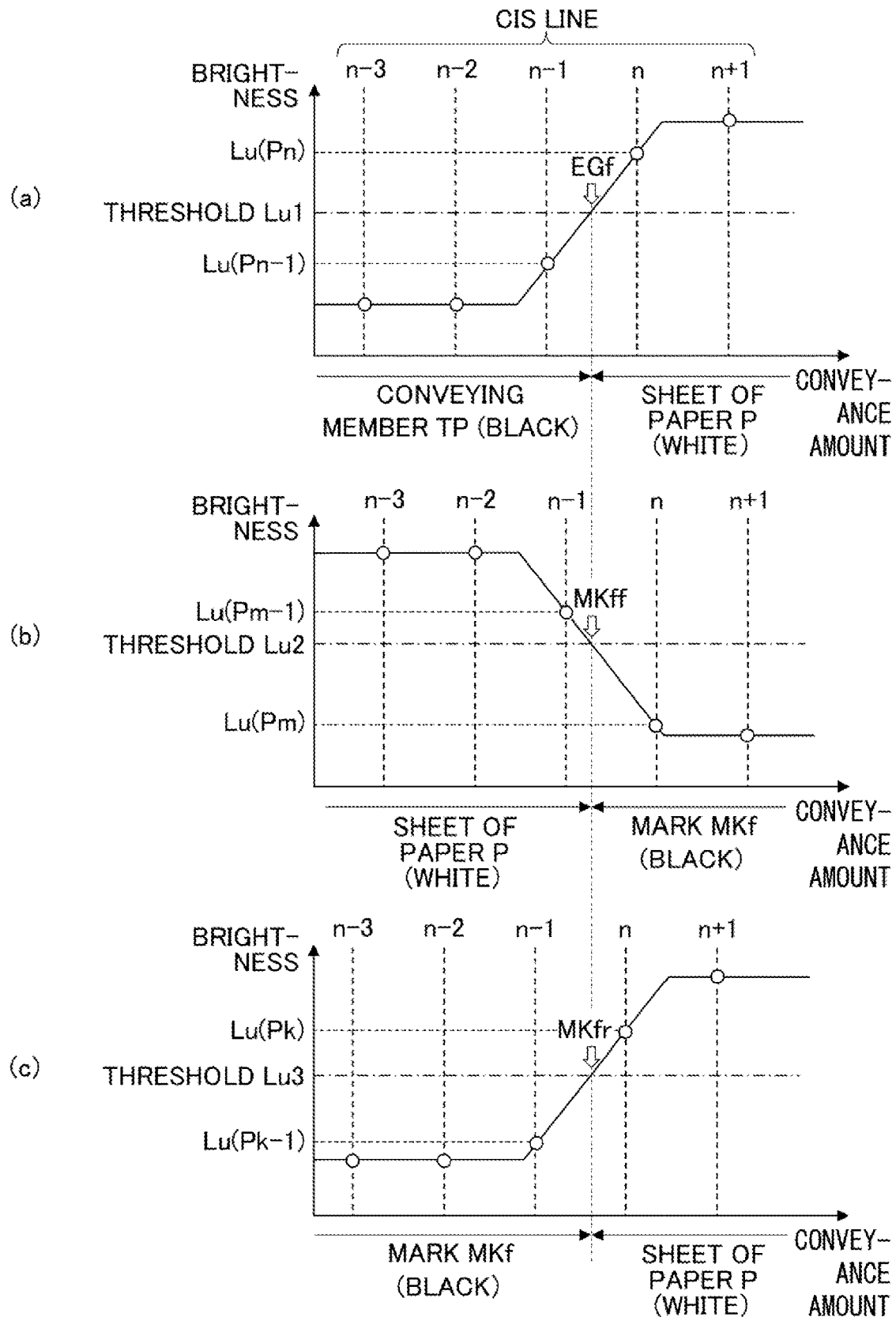
FIG. 6 is an explanatory diagram depicting an example of a method for calculating a position of a front edge of a sheet of paper, a front edge of a mark, and a rear edge of the mark.

FIG. 6 is an explanatory diagram depicting an example of a method of calculating a position of a front edge EGf of a sheet of paper P, a front edge MKff of a mark MKf, and a rear edge MKfr of the mark MKf. FIG. 6 (a) is a diagram for describing a threshold Lu1 for calculating a position of a front edge EGf of a sheet of paper P; FIG. 6 (b) is a diagram for describing a threshold Lu2 for calculating a position of a front edge MKff of a mark MKf; and FIG. 6 (c) is a diagram for describing a threshold Lu3 for calculating a position of a rear edge MKfr of the mark MKf. A threshold Lu1 of brightness for calculating a position of a front edge EGf of a sheet of paper P is set in advance. In addition, a threshold Lu2 of brightness for calculating a position of a front edge MKff of a mark MKf is set in advance. In addition, a threshold Lu3 of brightness for calculating a position of a rear edge MKfr of the mark MKf is set in advance. The threshold Lu1 is an example of a first threshold. The threshold Lu2 is an example of a second threshold. The threshold Lu3 is an example of a third threshold.

The thresholds Lu1, Lu2, and Lu3 will now be described. As a front edge EGf of the sheet of paper passes under the CIS 24 and 26 while a sheet of paper P is being conveyed on the conveying member TP, brightness of an image detected by the CIS 24 and 26 changes from brightness (the minimum brightness) of the black background of the conveying member TP to brightness (the maximum brightness) of a white background (a ground color) of the sheet of paper P.

As a front edge MKff of a mark MKf passes under the CIS 24 and 26, brightness of an image detected by the CIS 24 and 26 changes from brightness (the maximum value) of the white background of the sheet of paper P to brightness (the minimum value) of black of the mark MKf. As a rear edge MKfr of the mark MKf passes under the CIS 24 and 26, brightness of an image detected by the CIS 24 and 26 changes from brightness (the minimum value) of black of the mark MKf to brightness (the maximum value) of the white background of the sheet of paper P.

For example, when the front edge EGf of the sheet of paper is at a center of a line of the CIS 24 and 26 (i.e., for example, a center of a length of the light receiving elements with respect to the sub-scanning direction), brightness detected is a middle value between the maximum value and the minimum value. When the front edge EGf of the sheet of paper is positioned close to a conveying-roller (10) side (an upstream side with respect to the conveyance direction TD) in the line of CIS 24 and 26, brightness detected is lower than the middle value between the maximum value and the minimum value.

Similarly, when a front edge MKff of a mark MKf is at the center of the line of the CIS 24 and 26, brightness detected is a middle value between the maximum and minimum values. When the front edge MKff of the mark MKf is positioned close to the conveying-roller (10) side in the line of the CIS 24 and 26, the brightness detected is higher than the middle value between the maximum value and the minimum value.

When a rear edge MKfr of a mark MKf is at the center of the line of the CIS 24 and 26, brightness detected is a middle value between the maximum value and the minimum value. When the rear edge MKfr of the mark MKf is positioned close to the conveying-roller (10) side in the line of the CIS 24 and 26, brightness detected is lower than the middle value between the maximum value and the minimum value.

In the present embodiment, for example, each of the thresholds Lu1, Lu2, and Lu3 is set at 50% of a difference between the maximum brightness value and the minimum brightness value. As a result, the CPU 30 can determine whether a front edge EGf of a sheet of paper P, a front edge MKff of a mark MKf, or a rear edge MKfr of the mark MKf passes the centers of the lines the CIS 24 and 26.

As will be described later with reference to FIG. 9, the CPU 30 performs, for example, linear interpolation on the basis of a brightness value Lu(Pn) of a line Pn at which the brightness becomes greater than or equal to the threshold Lu1, a brightness value Lu(Pn−1) of the immediately preceding line Pn−1, and the threshold Lu1. Thus, the CPU 30 can accurately calculate a position of a front edge EGf of a sheet of paper.

In addition, the CPU 30 performs, for example, linear interpolation on the basis of a brightness value Lu(Pm) of a line Pm at which the brightness becomes smaller than or equal to the threshold Lu2, a brightness value Lu(Pm−1) of the immediately preceding line Pm−1, and the threshold Lu2. Thus, the CPU 30 can accurately calculate a position of a front edge MKff of a mark MKf.

In addition, the CPU 30 performs, for example, linear interpolation on the basis of a brightness value Lu(Pk) of a line Pk at which the brightness becomes greater than or equal to the threshold Lu3, a brightness value Lu(Pk−1) of the immediately preceding line Pk−1, and the threshold Lu3.

Thus, the CPU 30 can accurately calculate a position of a rear edge MKfr of a mark MKf. Further, the CPU 30 can accurately calculate a position of a rear edge EGr of a sheet of paper P, a front edge MKrf of a mark MKr, and a rear edge MKrr of the mark MKr similarly by performing, for example, linear interpolation.

The line Pn used to calculate the position of the front edge EGf or the rear edge EGr of the sheet of paper is an example of an edge line. The immediately preceding line Pn−1 used to calculate the position of the front edge EGf or the rear edge EGr of the sheet of paper is an example of an immediately preceding edge line.

The line Pm used to calculate the position of the front edge MKff of the mark MKf or the front edge MKrf of the mark MKr is an example of a front line. The line Pm−1 used to calculate the position of the front edge MKff of the mark MKf or the front edge MKrf of the mark MKr is an example of an immediately preceding front line.

The line Pk used to calculate the position of the rear edge MKfr of the mark MKf or the rear edge MKrr of the mark MKr is an example of a rear line. The line Pk−1 used to calculate the position of the rear edge MKfr of the mark MKf or the rear edge MKrr of the mark MKr is an example of an immediately preceding rear line.

Figure 7:
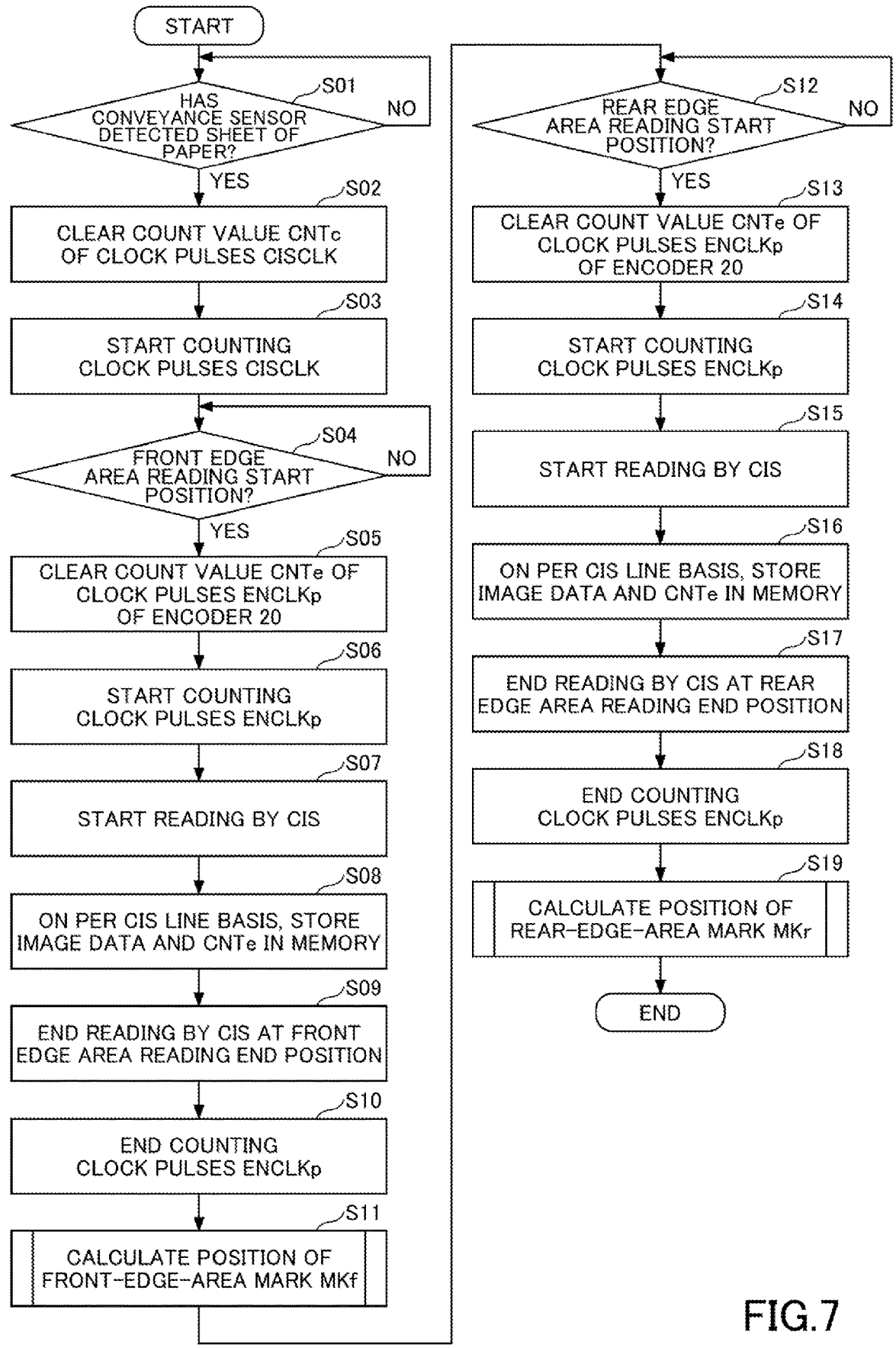
FIG. 7 is an operation flow diagram depicting an example of calculating a position of a mark on a sheet of paper with respect to a sub-scanning direction by the image forming apparatus of FIG. 1.

FIG. 7 is an operation flow diagram depicting an example of calculating a position of a mark MK on a sheet of paper P with respect to the sub-scanning direction by the image forming apparatus 100 of FIG. 1. That is, FIG. 7 depicts an example of a control method for controlling the image forming apparatus 100. For example, the processes depicted in FIG. 7 are implemented from the CPU 30 executing the control programs stored in the image forming apparatus 100.

A flow of FIG. 7 begins in response to conveyance of a sheet of paper P on the conveying member TP being started. First, in step S01, the CPU 30 waits until a front edge EGf of the sheet of paper P being conveyed on the conveying member TP is detected by the conveyance sensor 22. When the conveyance sensor 22 detects the front edge EGf of the sheet of paper, the CPU 30 proceeds to step S02.

In step S02, the CPU 30 clears a count value CNTc with respect to clock pulses CISCLK of the CIS 24 and 26. Next, in step S03, the CPU 30 starts counting clock pulses CISCLK. Next, in step S04, the CPU 30 waits until determining that a front edge area reading start position has come, and when having determining that the front edge area reading start position has come, the CPU 30 proceeds to step S05. For example, but not particularly limited, the CPU 30 detects that the front edge area reading start position has come, that is, has reached underneath the CIS 24 and 26 based on an increment of a count value of the base clock pulses ENCLK of the encoder 20 after the front edge EGf of the sheet of paper is detected by the conveyance sensor 22.

Next, in step S05, the CPU 30 clears a count value CNTe representing the number of clock pulses ENCLKp of the encoder 20. Next, in step S06, the CPU 30 starts counting clock pulses ENCLKp. Next, in step S07, the CPU 30 starts reading of an image by the CIS 24 and 26.

Next, in step S08, the CPU 30 stores image data obtained from the CIS 24 and 26 on a per line basis in the memory 32. Here, the image data is also brightness data for calculating a position of a mark MKf. The CPU 30 stores a count value CNTe with respect to clock pulses ENCLKp in the memory 32 in synchronization with an image reading timing (CNTc) with respect to the CIS 24 and 26. Thus, a brightness value of each line is associated with a count value CNTe.

Next, in step S09, based on an increment of a count value with respect to clock pulses ENCLK of the encoder 20, the CPU 30 detects that a front edge area reading end position has reached underneath the CIS 24 and 26, and ends reading of an image by the CIS 24 and 26.

Next, in step S10, the CPU 30 ends counting clock pulses ENCLKp. Next, in step S11, the CPU 30 calculates a position of a mark MKf in a front edge area (a front-edge-area mark MKf) in the sheet of paper P. The details of step S11 will be described later with reference to FIG. 8.

Next, in step S12, the CPU 30 waits until determining that a rear edge area reading start position has come, based on, for example, an increment of a count value of clock pulses ENCLK of the encoder 20. When having determined that the rear edge area reading start position has come, the CPU 30 proceeds to step S13.

Next, in step S13, the CPU 30 clears a count value CNTe representing the number of clock pulses ENCLKp of the encoder 20. Next, in step S14, the CPU 30 starts counting clock pulses ENCLKp. Next, in step S15, the CPU 30 starts reading an image by the CIS 24 and 26.

Next, in step S16, the CPU 30 stores image data obtained from the CIS 24 and 26 on a per line basis in the memory 32. The CPU 30 stores a count value CNTe with respect to clock pulses ENCLKp in the memory 32 in synchronization with an image reading timing (CNTc) with respect to the CIS 24 and 26.

Next, in step S17, based on an increment of a count value with respect to clock pulses ENCLK of the encoder 20, the CPU 30 detects that a rear edge area reading end position has reached underneath the CIS 24 and 26, and ends reading of an image by the CIS 24 and 26.

Next, in step S18, the CPU 30 ends counting clock pulses ENCLKp. Next, in step S19, the CPU 30 calculates a position of a mark MKr in a rear edge area (a rear-edge-area mark MKr) in the sheet of paper P. The details of step S19 will be described later with reference to FIG. 9.

Figure 8:
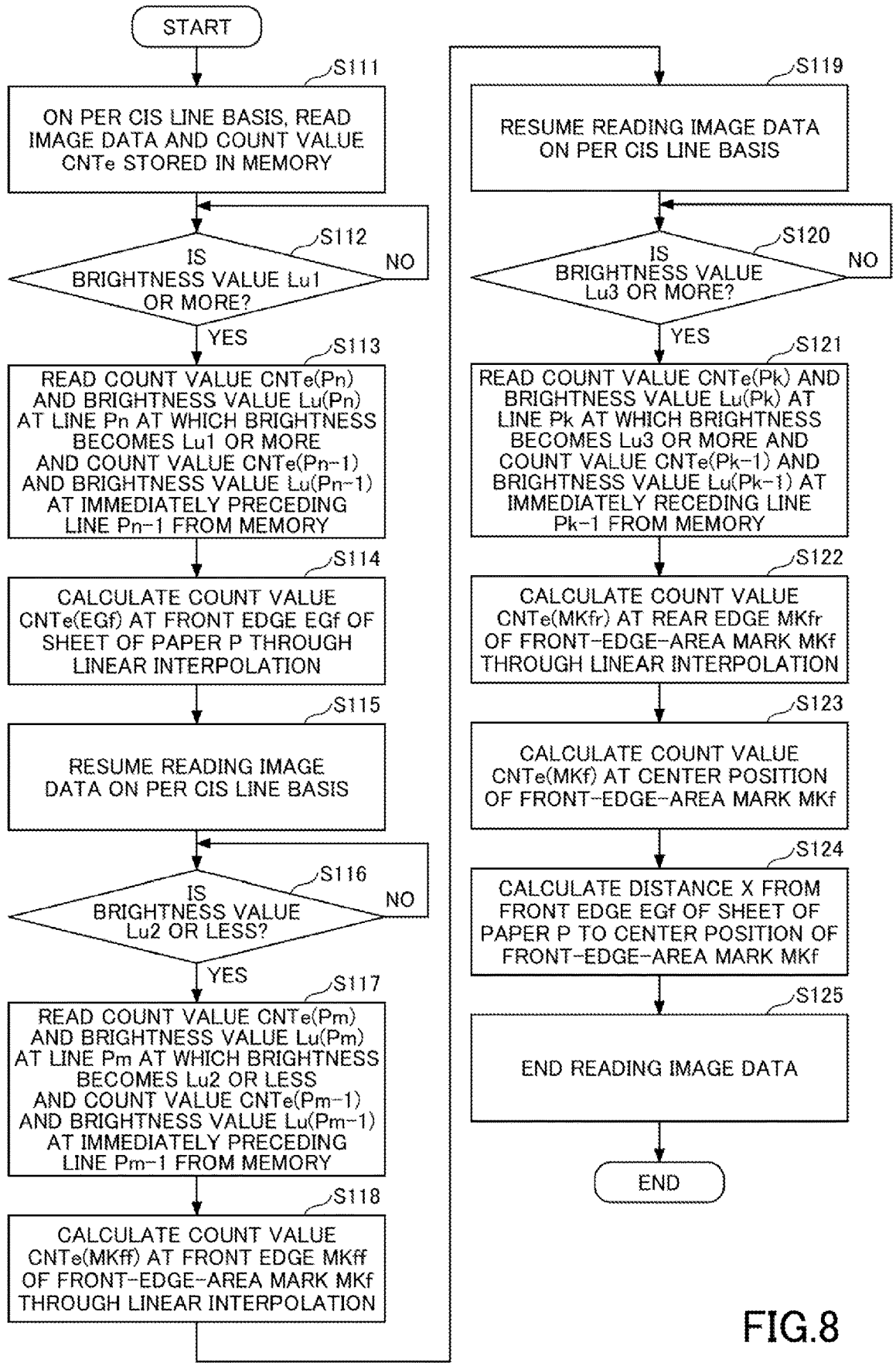
FIG. 8 is a diagram depicting an example of step S11 of FIG. 7.

FIG. 8 is an operation flow diagram depicting an example of step S11 in FIG. 7. In step S111, the CPU 30 reads, on a per line basis with respect to the CIS 24 and 26, image data and a count value CNTe of the encoder 20, stored in the memory 32 in step S08 of FIG. 7, from the memory 32. Next, in step S112, the CPU 30 searches for the image data in the order in which the image data has been read until the brightness of image data becomes greater than or equal to the threshold Lu1. The CPU 30 proceeds to step S113 when a line at which the brightness becomes greater than or equal to the threshold Lu1 is found.

In step S113, the CPU 30 reads from the memory 32 a count value CNTe(Pn) and a brightness value Lu(Pn) of the line Pn at which the brightness becomes greater than or equal to the threshold Lu1. The CPU 30 reads a count value CNTe(Pn−1) and a brightness value Lu(Pn−1) of an immediately preceding line Pn−1 from the memory 32. Next, in step S114, the CPU 30 calculates a count value CNTe(EGf) corresponding to a position of a front edge EGf of a sheet of paper through, for example, linear interpolation.

For example, the CPU 30 calculates the count value CNTe(EGf) corresponding to the position of the front edge EGf of the sheet of paper through linear interpolation using Formula (1) below. In Formula (1) and formulas that will be described later, the sign "×" denotes multiplication.

$$CNTe(EGf)=CNTe(Pn-1)+\{(CNTe(Pn)-CNTe(Pn-1))/(Lu(Pn)-Lu(Pn-1))\}\times(Lu1-Lu(Pn-1)) \quad (1)$$

Next, in step S115, the CPU 30 resumes reading from the memory 32 image data on a per line basis with respect to the CIS 24 and 26. Next, in step S116, the CPU 30 searches for the image data in the order in which the image data has been read until the brightness of image data becomes smaller than or equal to the threshold Lu2. The CPU 30 proceeds to step S117 when a line at which the brightness becomes smaller than or equal to the threshold Lu2 is found.

In step S117, the CPU 30 reads from the memory 32 a count value CNTe(Pm) and a brightness value Lu(Pm) of the line Pm at which the brightness becomes smaller than or equal to the threshold Lu2. The CPU 30 reads a count value CNTe(Pm−1) and a brightness value Lu(Pm−1) of an immediately preceding line Pm−1 from the memory 32.

Next, in step S118, the CPU 30 calculates a count value CNTe(MKff) corresponding to a position of a front edge MKff of a front-edge-area mark MKf on the sheet of paper P through, for example, linear interpolation.

For example, the CPU 30 calculates the count value CNTe(MKff) corresponding to the position of the front edge MKff of the mark MKf through linear interpolation using Formula (2) below.

$$CNTe(MKff)=CNTe(Pm-1)+\{(CNTe(Pm)-CNTe(Pm-1))/(Lu(Pm)-Lu(Pm-1))\}\times(Lu2-Lu(Pm-1)) \quad (2)$$

Next, in step S119, the CPU 30 resumes reading from the memory 32 image data on a per line basis with respect to the CIS 24 and 26. Next, in step S120, the CPU 30 searches for the image data in the order in which the image data has been read until the brightness of image data becomes greater than or equal to the threshold Lu3. The CPU 30 proceeds to step S121 when a line at which the brightness becomes greater than or equal to the threshold Lu3 is found.

In step S121, the CPU 30 reads from the memory 32 a count value CNTe(Pk) and a brightness value Lu(Pk) of the line Pk at which the brightness becomes greater than or equal to the threshold Lu3. The CPU 30 reads a count value CNTe(Pk−1) and a brightness value Lu(Pk−1) of an immediately preceding line Pk−1 from the memory 32. Next, in step S122, the CPU 30 calculates a count value CNTe(MKfr) corresponding to a position of a rear edge MKfr of a front-edge-area mark MKf on the sheet of paper P through, for example, linear interpolation.

For example, the CPU 30 calculates the count value CNTe(MKfr) corresponding to the position of the rear edge MKfr of the mark MKf through linear interpolation using Formula (3) below.

$$CNTe(MKfr)=CNTe(Pk-1)+\{(CNTe(Pk)-CNTe(Pk-1))/(Lu(Pk)-Lu(Pk-1))\}\times(Lu3-Lu(Pk-1)) \quad (3)$$

Next, in step S123, the CPU 30 calculates a count value CNTe(MKf) corresponding to a center position of the front-edge-area mark MKf on the sheet of paper P using the count values CNTe(MKff) and CNTe(MKfr) calculated in steps S118 and S122. The count value CNTe(MKf) is an example of an intermediate value. For example, the CPU 30 calculates the count value CNTe(MKf) corresponding to the center position of the front-edge-area mark MKf on the sheet of paper P using Formula (4) below.

$$CNTe(MKf)=(CNTe(MKff)+CNTe(MKfr))/2 \quad (4)$$

Next, in step S124, the CPU 30 calculates a distance X from the front edge EGf of the sheet of paper P to the center position of the front-edge-area mark MKf using the count value CNTe(EGf) corresponding to the front edge EGf of the sheet of paper P calculated in step S114. For example, the CPU 30 calculates the distance X using Formula (5) below. In Formula (5), a reference sign ENres denotes a resolution of the encoder 20 and represents a distance per increment of a count value CNTe.

$$X=(\mathrm{CNT}e(\mathrm{MK}f)-\mathrm{CNT}e(\mathrm{EG}f))\times \mathrm{EN}res \quad (5)$$

Next, in step S125, the CPU 30 ends reading image data and ends the operation of calculating the position of the front-edge-area mark MKf on the sheet of paper P with respect to the sub-scanning direction described with reference to FIG. 8.

As described above with reference to FIG. 8, the positions of the front edge EGf of the sheet of paper P, and the front edge MKff and the rear edge MKfr of the mark MKf can be accurately calculated as count values CNTe of the encoder 20 through, for example, linear interpolation using Formulas (1)-(3). Then, by using the count values CNTe corresponding to the positions of the front edge EGf, the front edge MKff, and the rear edge MKfr, a distance X from the front edge EGf of the sheet of paper P to the center of the mark MKf can be accurately calculated.

Figure 9:
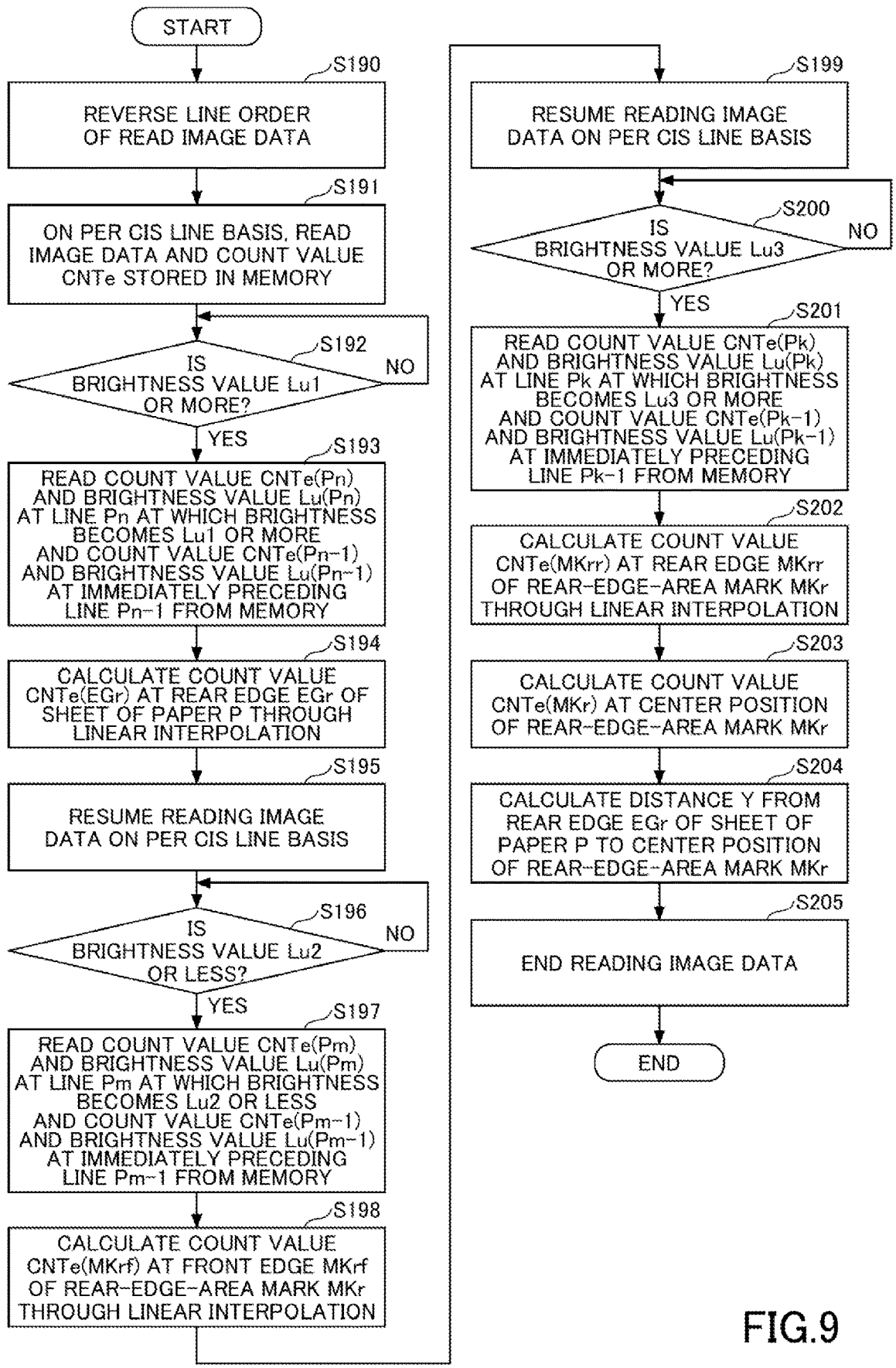
FIG. 9 is a diagram depicting an example of step S19 of FIG. 7.

FIG. 9 is an operation flow diagram depicting an example of step S19 of FIG. 7. For the same process as the process in FIG. 8, the detailed description will be omitted. When a position of a rear-edge-area mark MKr on a sheet of paper P is calculated, in step S190, the CPU 30 reverses the order of lines of image data that has been read by the CIS 24 and 26 from the CPU 30 starting reading the rear edge area to the CPU 30 ending reading the rear edge area in the flow of FIG. 4. When the order of the lines of image data to be read from the memory 32 is to be thus reversed, the CPU 30 regards the rear edge EGr of the sheet of paper P as the front edge EGf of the sheet of paper. Thus, the position of the mark MKr in the rear edge area on the sheet of paper P can be calculated using the same operation flow as in FIG. 8. For example, the above-described Formulas (1)-(3) can be used.

Steps S191, S192, and S193 performed after step S190 are similar to steps S111, S112, and S113, respectively, depicted in FIG. 8. After step S193, in step S194, the CPU 30 calculates a count value CNTe(EGr) corresponding to a position of a rear edge EGr of the sheet of paper through, for example, linear interpolation. For example, the CPU 30 replaces a count value CNTe(EGf) on the left side of Formula (1) mentioned above with a count value CNTe (EGr), and calculates the count value CNTe(EGr) using Formula (1).

Steps S195, S196, and S197 performed after step S194 are similar to steps S115, S116, and S117 of FIG. 8, respectively. After step S197, in step S198, the CPU 30 calculates a count value CNTe(MKrf) corresponding to a position of a front edge MKrf of a rear-edge-area mark MKr on the sheet of paper P through, for example, linear interpolation.

For example, the CPU 30 calculates the count value CNTe(MKrf) corresponding to the position of the front edge MKrf of the mark MKr through linear interpolation using Formula (2). At this time, the CPU 30 replaces a count value CNTe(MKff) on the left side of Formula (2) described above with a count value CNTe(MKrf), and calculates the count value CNTe(MKff) using Formula (2).

Steps S199, S200, and S201 performed after step S198 are similar to steps S119, S120, and S121 of FIG. 8, respectively. After step S201, in step S202, the CPU 30 calculates a count value CNTe(MKrr) corresponding to a position of a rear edge MKrr of a rear-edge-area mark MKr on the sheet of paper P through, for example, linear interpolation.

For example, the CPU 30 calculates a count value CNTe (MKrr) corresponding to the position of the rear edge MKrr of the mark MKr through linear interpolation using Formula (3). For example, the CPU 30 replaces a count value CNTe(MKfr) on the left side of Formula (3) described above with a count value CNTe(MKrr), and calculates the count value CNTe(MKrr) using Formula (3).

Next, in step S203, the CPU 30 calculates a count value CNTe(MKr) corresponding to a center position of the rear-edge-area mark MKr on the sheet of paper P using count values CNTe(MKrf) and CNTe(MKrr) calculated in steps S198 and S202. For example, the CPU 30 uses Formula (6) below to calculate the count value CNTe(MKr) corresponding to the center position of the rear-edge-area mark MKr on the sheet of paper P.

$$\mathrm{CNT}e(\mathrm{MK}r)=(\mathrm{CNT}e(\mathrm{MK}rf)+\mathrm{CNT}e(\mathrm{MK}rr))/2 \quad (6)$$

Next, in step S204, the CPU 30 calculates a distance Y from a rear edge EGr of the sheet of paper P to a center position of the rear-edge-area mark MKr in the rear edge area using the count value CNTe(EGr) corresponding to the rear edge EGr of the sheet of paper P calculated in step S194. For example, CPU 30 calculates the distance Y using Formula (7) below.

$$Y=(\mathrm{CNT}e(\mathrm{MK}r)-\mathrm{CNT}e(\mathrm{EG}r)33\ \mathrm{EN}res \quad (7)$$

Next, in step S205, the CPU 30 ends the reading of the image data and ends the operation of calculating the position of the rear-edge-area mark MKr on the sheet of paper P with respect to the sub-scanning direction described with reference to FIG. 9.

As described above, also in FIG. 9, the positions of the rear edge EGr of the sheet of paper P, and the front edge MKrf and the rear edge MKrr of the mark MKr can be accurately calculated as count values CNTe of the encoder 20 through, for example, linear interpolation using Formulas (1)-(3). Then, by using the count values CNTe corresponding to the position of the rear edge EGr, the front edge MKrf, and the rear edge MKrr, the distance Y from the rear edge EGr of the sheet of paper P to the center of the mark MKr can be accurately calculated.

As described above, in the present embodiment, the CPU 30 associates a count value CNTe output from the encoder 20 with a read line with respect to the CIS 24 and 26. The CPU 30 then detects the positions of the mark MKf and the mark MKr on the sheet of paper P using the differences between the count values CNTe corresponding to the edges EGf and EGr of the sheet of paper P and the count values CNTe corresponding to the center positions of the mark MKf and the mark MKr, respectively. Therefore, for example, when the conveyance speed of the sheet of paper P by the conveying motors 14 and 16 varies and conveyance speed irregularities are generated with respect to the sheet of paper P, the positions of the marks MKf and MKr printed on the sheet of paper P can be accurately detected.

The positions of the front edge EGf of the sheet of paper P, and the front edge MKff and the rear edge MKfr of the mark MKf can be accurately calculated as the count values CNTe of the encoder 20 through, for example, linear interpolation using Formulas (1)-(3). Then, by using the count values CNTe corresponding to the positions of the front edge EGf, the front edge MKff, and the rear edge MKfr, the distance X from the front edge EGf of the sheet of paper P to the center of the mark MKf can be accurately calculated.

In addition, the positions of the rear edge EGr of the sheet of paper P, and the front edge MKrf and the rear edge MKrr of the mark MKr can be accurately calculated as the counts value CNTe of the encoder 20 through, for example, linear interpolation using Formulas (1) to (3). Then, by using the count values CNTe corresponding to the positions of the rear edge EGr, the front edge MKrf, and the rear edge MKrr, the distance Y from the rear edge EGr of the sheet of paper P to the center of the mark MKr can be accurately calculated.

When the position of the rear-edge-area mark MKr on the sheet of paper P is calculated, the position of the mark MKr on the sheet of paper P can be calculated using the operation flow similar to the operation flow for calculating the position of the front-edge-area mark MKf on the sheet of paper P, by reversing the order of the lines of the image data.

For example, the position of the front edge EGf of the sheet of paper can be accurately calculated through, for example, linear interpolation based on the brightness value Lu(Pn) of the line Pn at which the brightness becomes greater than or equal to the threshold Lu1, the brightness value Lu(Pn−1) of the immediately preceding line Pn−1, and the threshold Lu1. The position of the front edge MKff of the mark MKf can be accurately calculated through, for example, linear interpolation based on the brightness value Lu(Pn) of the line Pn at which the brightness becomes smaller than or equal to the threshold Lu2, the brightness value Lu(Pn−1) of the immediately preceding line Pn−1, and the threshold Lu2.

The position of the rear edge MKfr of the mark MKf can be accurately calculated through, for example, linear interpolation based on the brightness value Lu(Pn) of the line Pn at which brightness becomes greater than or equal to the threshold Lu3, the brightness value Lu(Pn−1) of the immediately preceding line Pn−1, and the threshold Lu3. In a similar way, the positions of the rear edge EGr of the sheet of paper P, the front edge MKrf of the mark MKr, and the rear edge MKrr of the mark MKr can be accurately calculated through, for example, linear interpolation.

Positions of marks MK printed on a front side of a sheet of paper P calculated by the mark position calculating apparatus 300 can be used to correct a position, tilt, shape, or the like of an image when printing the image on a back side of the sheet of paper.

Second Embodiment

Figure 10A:
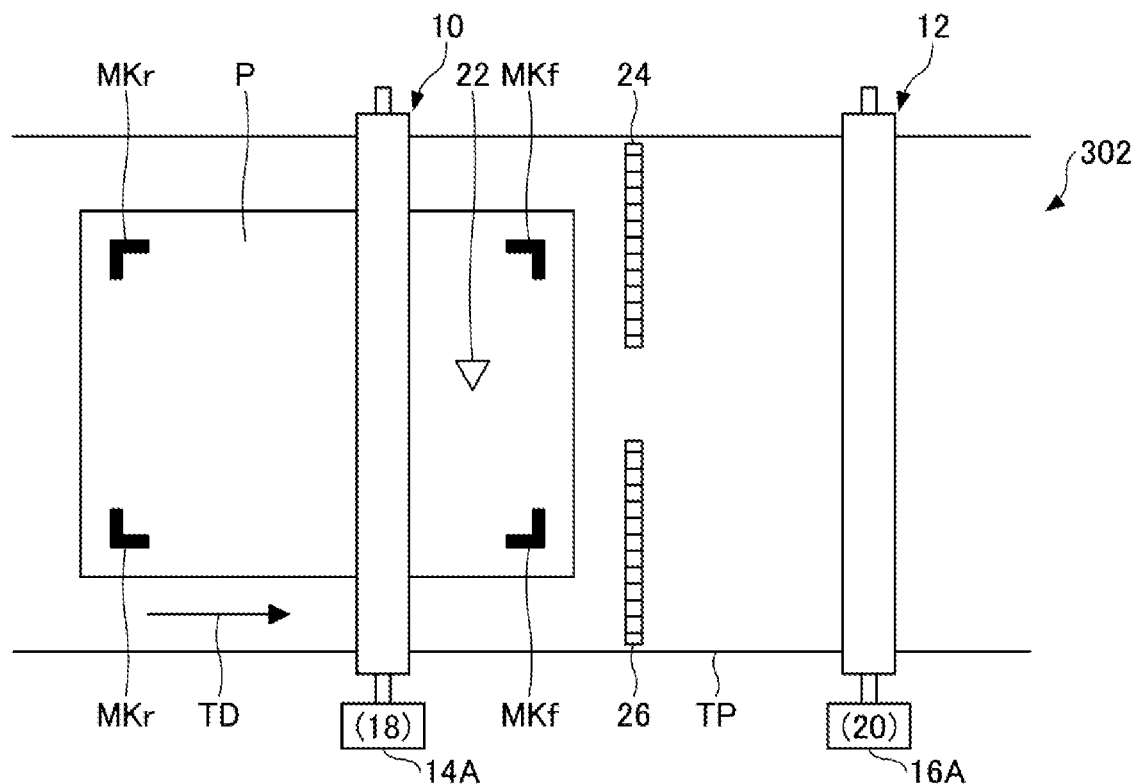
FIGS. 10A and 10B are explanatory diagrams depicting an outline of the mark position calculating apparatus installed in the image forming apparatus according to a second embodiment.
Figure 10B:
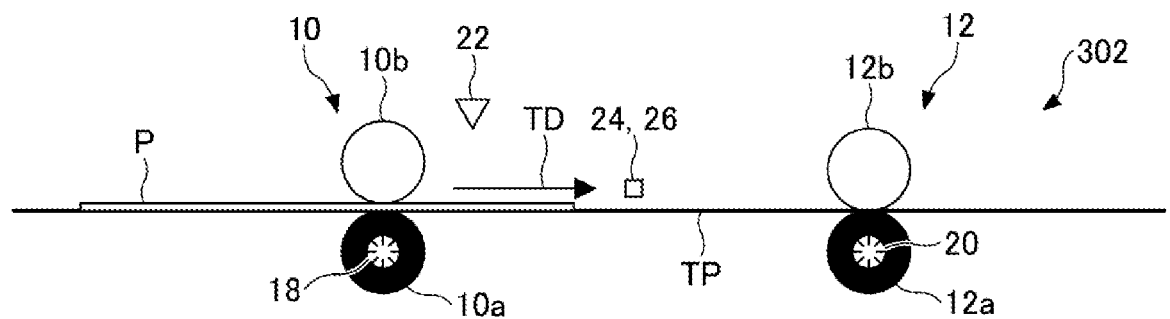

FIGS. 10A and 10B are explanatory diagrams depicting an outline of the mark position calculating apparatus 302 provided in the image forming apparatus according to a second embodiment. FIG. 10A depicts a plan view of major parts of the mark position calculating apparatus 302, and FIG. 10B depicts a side view of major parts of the mark position calculating apparatus 302. For elements similar to the elements in the above-described embodiments, the detailed description will be omitted. The mark position calculating apparatus 302 depicted in FIGS. 10A and 10B instead of the mark position calculating apparatus 300 is provided in the image forming unit 210 of the image forming apparatus 100 depicted in FIG. 1.

The mark position calculating apparatus 302 includes the conveying motor 14A having the encoder 18 built in the conveying motor 14A instead of the conveying motor 14 depicted in FIGS. 2A and 2B. Therefore, the encoder 18 is not mounted to the other end of the driving roller 10a. The mark position calculating apparatus 302 includes the conveying motor 16A having the encoder 20 built in the conveying motor 16A instead of the conveying motor 16 depicted in FIGS. 2A and 2B. Therefore, the encoder 20 is not mounted to the other end of the driven roller 12b.

The other elements of the mark position calculating apparatus 302 are similar to the elements of the mark position calculating apparatus 300 in FIGS. 2A and 2B. Because the encoders are not mounted to the driving roller and the driven roller by employing the conveying motors 14A and 16A having the encoders built in the conveying motors 14A and 16A, the cost of the mark position calculating apparatus 302 can be reduced. According to the present embodiment, even in a case where there is no space to mount the encoders to the driving roller and the driven roller, the positions of the marks MKf and MKr can be detected.

The functional block diagram of the mark position calculating apparatus 302 is the same as the functional block diagram of FIG. 3, except that the encoders 18 and 20 are built in the conveying motors 14A and 16A. That is, the mark position calculating apparatus 302 performs operations of calculating positions of marks MKf and MKr through executing the control programs by the CPU 30. The method for calculating positions of marks MKf and MKr is the same as the method described with reference to FIGS. 4-9.

As described above, in the present embodiment, substantially the same advantageous effects as the advantageous effects in the above-described embodiments can be obtained.

Third Embodiment

Figure 11A:
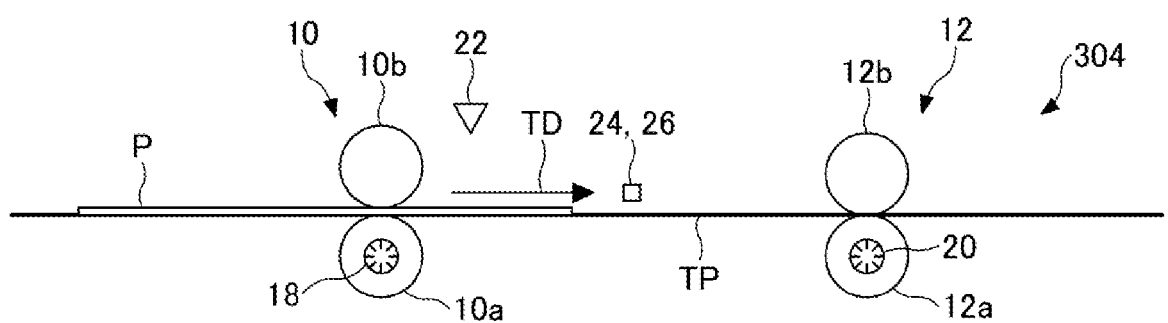
FIGS. 11A, 11A and 11B are explanatory diagrams depicting an outline of the mark position calculating apparatus installed in the image forming apparatus according to a third embodiment.
Figure 11B:
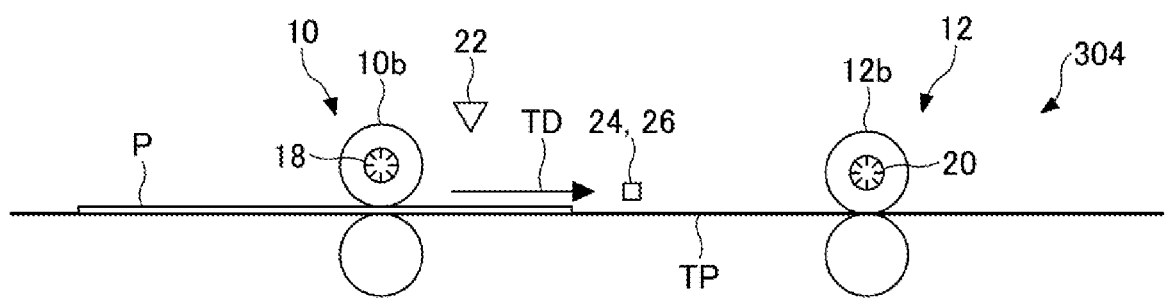

FIGS. 11A and 11B are explanatory diagrams depicting an outline of the mark position calculating apparatus 304 provided in the image forming apparatus according to a third embodiment. For elements similar to the elements in the above-described embodiments, the detailed description will be omitted. The mark position calculating apparatus 304 depicted in FIGS. 11A and 11B instead of the mark position calculating apparatus 300 is provided in the image forming unit 210 of the image forming apparatus 100 depicted in FIG. 1.

The mark position calculating apparatus 304 has the same configuration as the configuration of the mark position calculating apparatus 300 in FIGS. 2A and 2B except that mounting positions of the encoders 18 and 20 are different as will be described later. That is, the mark position calculating apparatus 304 performs operations of calculating positions of marks MKf and MKr through executing the control programs by the CPU 30. The method for calculating positions of marks MKf and MKr is the same as the method described with reference to FIGS. 4-9.

As depicted in FIG. 11A, the mark position calculating apparatus 304 may include the encoder 18 mounted to the driving roller 10a and the encoder 20 mounted to the driving roller 12a. Alternatively, the mark position calculating apparatus 304 may include the encoder 18 mounted to the driven roller 10b and the encoder 20 mounted to the driven roller 12b as depicted in FIG. 11B.

The encoders used for calculating a position of a sheet of paper P conveyed on the conveying member TP or calculating positions of marks MK on the sheet of paper P are desirably mounted to the driven rollers that are not driven directly by the conveyance motors. However, if there is no space to mount the encoders to the driven rollers, the encoders may be mounted to the driving rollers. As described above, in the present embodiment, substantially the same advantageous effects as the advantageous effects in the above-described embodiments can be obtained.

Fourth Embodiment

Figure 12A:
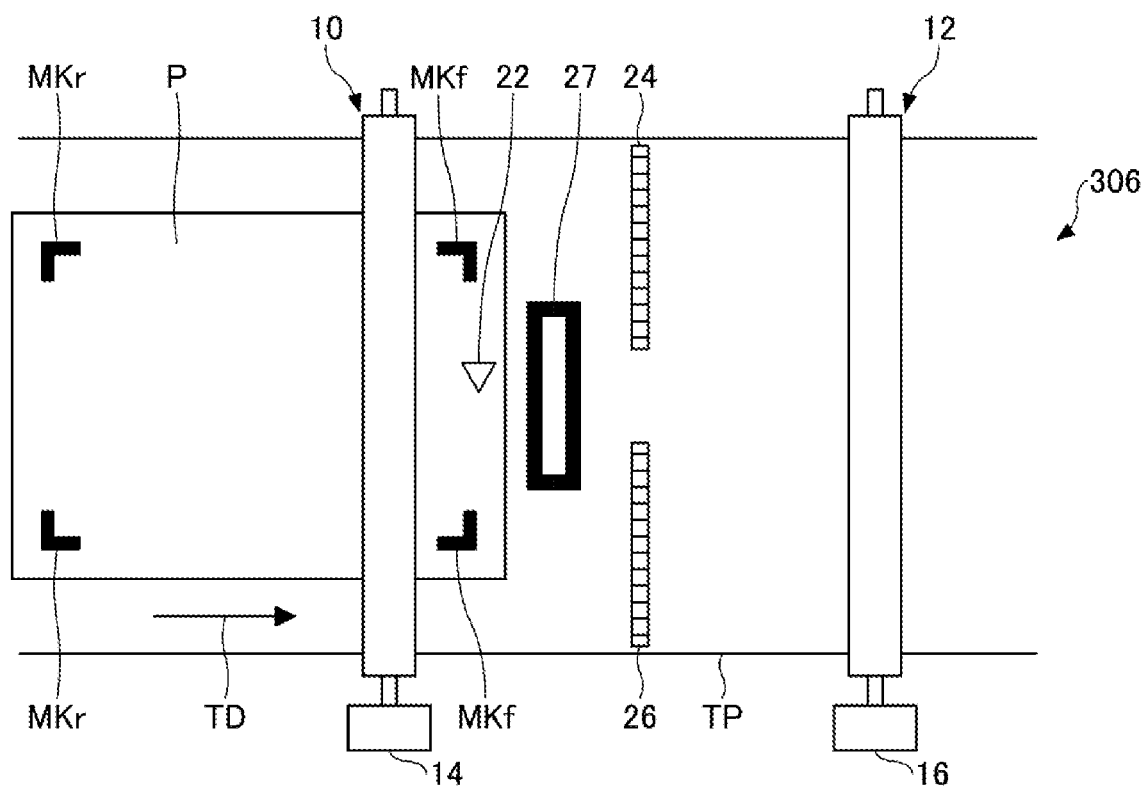
FIGS. 12A and 12B are explanatory diagrams depicting an outline of the mark position calculating apparatus installed in the image forming apparatus according to a fourth embodiment.
Figure 12B:
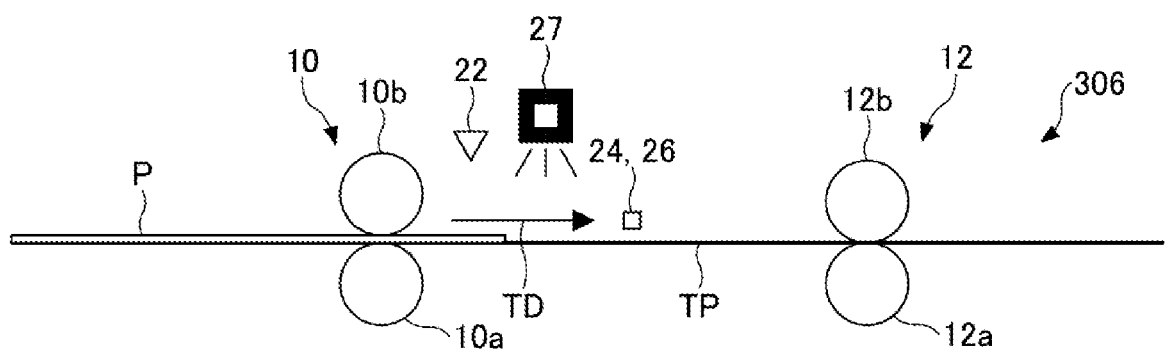

FIGS. 12A and 12B are explanatory diagrams depicting an outline of the mark position calculating apparatus 306 provided in the image forming apparatus according to a fourth embodiment. FIG. 12A depicts a plan view of major parts of the mark position calculating apparatus 306, and FIG. 12B depicts a side view of major parts of the mark position calculating apparatus 306. For elements similar to the elements in the above-described embodiments, the detailed description will be omitted. The mark position calculating apparatus 306 depicted in FIGS. 12A and 12B instead of the mark position calculating apparatus 300 is provided in the image forming unit 210 of the image forming apparatus 100 depicted in FIG. 1.

The mark position calculating apparatus 306 has the same configuration as the configuration of the mark position calculating apparatus 300 in FIGS. 2A and 2B except that a laser Doppler velocimeter 27 is used instead of the encoders 18 and 20 in FIGS. 2A and 2B. That is, the mark position calculating apparatus 306 performs operations of calculating positions of marks MKf and MKr through executing the control programs by the CPU 30. The method for calculating positions of marks MKf and MKr is the same as the method described with reference to FIGS. 4-9.

For example, the laser Doppler velocimeter 27 is disposed above the conveying member TP where a longitudinal direction of the laser Doppler velocimeter 27 corresponds to the main scanning direction (the extending direction of the CIS 24 and 26) between the conveyance sensor 22 and the CIS 24 and 26. The CPU 30 depicted in FIGS. 2A and 2B calculates positions of marks MKf and MKr on a sheet of paper P using a conveyance speed of the sheet of paper P received from the laser Doppler velocimeter 27 and the line cycle of the CIS 24 and 26. The CPU 30, which calculates positions of marks MKf and MKr on a sheet of paper P by using the conveyance speed and the line cycle of the sheet of paper P, is an example of a processor.

By using the laser Doppler velocimeter 27, an actual conveyance speed of a sheet of paper P can be detected. Therefore, even when a conveyance speed of a sheet of paper P conveyed by the conveying motors 14 and 16 changes, the conveyance speed can be accurately detected on a moment-to-moment basis, and positions of marks MKf and MKr on the sheet of paper P can be accurately calculated. As described above, in the present embodiment, substantially the same advantageous effects as the advantageous effects in the above-described embodiments can be obtained.

Although the image forming apparatuses and the methods for controlling image forming apparatuses have been described with reference to the embodiments, the present invention is not limited to the embodiments, and various variations and modifications can be made within the scope of the present invention.

With regard to the above-described embodiments, an example of detecting positions of marks MK that are printed on a front side of a sheet of paper P by the image forming unit 210 of FIG. 1 has been described. However, the mark position calculating apparatuses 300, 302, 304, and 306 may also detect positions of marks MK previously printed on a sheet of paper P. Further, the mark position calculating apparatus 300, 302, 304, and 306 can calculate not only a distance from an edge of a sheet of paper P to a mark MK, but also a distance between any marks MK. Alternatively, the mark position calculating apparatuses 300, 302, 304, and 306 can calculate a distance (a length with respect to the conveyance direction of a sheet of paper P) between opposite edges of the sheet of paper P.

What is claimed is:

1. An image forming apparatus comprising:
a conveyer configured to convey a recording medium on which a mark is formed;
an image reader configured to read an image formed on the recording medium while the recording medium is being conveyed;
a detector configured to detect a value corresponding to a conveyance amount of the recording medium conveyed by the conveyer and output the detected value; and
a processor and a memory that stores program instructions causing the processor to calculate a position of the mark on the recording medium with respect to a conveyance direction of the recording medium based on respective detected values output from the detector when an edge of the recording medium and the mark are read by the image reader;
wherein
the image reader is configured to read the image on a per line basis with respect to a line extending along a direction perpendicular to the conveyance direction of the recording medium,
a length of the mark with respect to the conveyance direction is greater than twice a width of each line with respect to the conveyance direction, and
the program instructions further cause the processor to
detect, based on a brightness value of each line read by the image reader, the edge of the recording medium, a front edge of the mark, and a rear edge of the mark, and
calculate a position of the mark on the recording medium with respect to the conveyance direction based on a difference between (i) an intermediate value between a detected value output from the detector corresponding to a front line at which the front edge of the mark is detected and a detected value output from the detector corresponding to a rear line at which the rear edge of the mark is detected, and (ii) a detected value output from the detector corresponding to an edge line at which the edge of the recording medium is detected.

2. The image forming apparatus according to claim 1, wherein
the program instructions further cause the processor to
detect the edge of the recording medium based on a first threshold set between a brightness value of a line detected by the image reader before the edge of the recording medium being conveyed to the image reader reaches the image reader and a brightness value of a background color of the recording medium, and
calculate a position of the edge in the width of the edge line based on a product of a ratio and a detected value difference, the ratio being a ratio between (i) a difference between a brightness value of the edge line and a brightness value of an immediately preceding edge line that is a line immediately preceding the edge line and (ii) a difference between the brightness value of the immediately preceding edge line and the first threshold, the detected value difference being a difference between (iii) a detected value output from the detector corresponding to the edge line and (iv) a detected value output from the detector corresponding to the immediately preceding edge line.

3. The image forming apparatus according to claim 1, wherein
the program instructions further cause the processor to
detect the front edge of the mark based on a second threshold set between a brightness value of a background color of the recording medium and a brightness value of the mark, and calculate a position of the front edge in a width of the front line based on a product of a ratio and a detected value difference, the ratio being a ratio between (i) a difference between a brightness value of the front line and a brightness value of an immediately preceding front line that is a line immediately preceding the front line and (ii) a difference between the brightness value of the immediately preceding front line and the second threshold, the detected value difference being a difference between (iii) a detected value output from the detector corresponding to the front line and (iv) a detected value output from the detector corresponding to the immediately preceding front line.

4. The image forming apparatus according to claim 1, wherein
the program instructions further cause the processor to
detect the rear edge of the mark based on a third threshold set between a brightness value of the background color of the recording medium and a brightness value of the mark, and calculate a position of the rear edge in a width of the rear line based on a product of a ratio and a detected value difference, the ratio being a ratio between (i) a difference between a brightness value of the rear line and a brightness value of an immediately preceding rear line that is a line immediately preceding the rear line and (ii) a difference between a brightness value of the immediately preceding rear line and the third threshold, the detected value difference being a difference between (iii) a detected value output from the detector corresponding to the rear line and (iv) a detected value output from the detector corresponding to the immediately preceding rear line.

5. The image forming apparatus according to claim 1, wherein
the program instructions further cause the processor to
store in the memory an image of each line read by the image reader in association with a detected value output from the detector, the mark is formed in each of a front edge area and a rear edge area on the recording medium with respect to the conveyance direction, and the program instructions further cause the processor to read an image of each line from the memory in an order read by the image reader, and calculate a position of the mark in the front edge area, and read an image of each line from the memory in an order reverse from the order of read by the image reader, and calculate a position of the mark in the rear edge area.

6. The image forming apparatus according to claim 1, wherein
the detector is an encoder mounted on a driving roller connected to a conveying motor, an encoder mounted on a driven roller driven by the driving roller, or an encoder installed inside the conveying motor.

7. The image forming apparatus according to claim 1, wherein
the detector includes a laser Doppler velocimeter configured to detect a conveyance speed of the recording medium, and the program instructions further cause the processor to calculate the detected value by multiplying the conveyance speed detected by the laser Doppler velocimeter by a cycle of a line.

8. The image forming apparatus according to claim 1, further comprising:
an image forming processor and a memory that stores image forming program instructions causing the image forming processor to control forming of an image on the recording medium,
wherein
the conveyer is configured to convey the recording medium on which the mark is formed on a first side of the recording medium under the control of the image forming processor, and the image forming program instructions further cause the image forming processor to correct a position of an image to be formed on a second side of the recording medium conveyed by the conveyer based on a position of the mark with respect to the conveyance direction, the position of the mark being calculated by the processor.

9. A control method for controlling an image forming apparatus that includes a processor and a memory that stores program instructions causing the processor to execute the control method, the control method comprising:
conveying a recording medium on which a mark is formed;
reading an image formed on the recording medium while the recording medium is being conveyed;
detecting a value corresponding to a conveyance amount of the recording medium conveyed and outputting the detected value; and
calculating a position of the mark on the recording medium with respect to a conveyance direction of the recording medium based on respective detected values output when an edge of the recording medium and the mark are read,
wherein
the reading comprises reading the image on a per line basis with respect to a line extending along a direction perpendicular to the conveyance direction of the recording medium,
a length of the mark with respect to the conveyance direction is greater than twice a width of each line with respect to the conveyance direction,
wherein the control method further comprises
detecting, based on a brightness value of each line read, the edge of the recording medium, a front edge of the mark, and a rear edge of the mark, and calculating a position of the mark on the recording medium with respect to the conveyance direction based on a difference between (i) an intermediate value between a detected value corresponding to a front line at which the front edge of the mark is detected and a detected value corresponding to a rear line at which the rear edge of the mark is detected, and (ii) a detected value corresponding to an edge line at which the edge of the recording medium is detected.

* * * * *